US012754834B2

(12) United States Patent
Godwin et al.

(10) Patent No.: US 12,754,834 B2
(45) Date of Patent: Oct. 6, 2026

(54) DATA STORAGE ACCESSIBLE BY A HOST USING DIFFERENT COMMUNICATION PROTOCOLS BASED ON THE MATING ORIENTATION OF A REVERSIBLE CONNECTOR

(71) Applicant: Sandisk Technologies, Inc., Milpitas, CA (US)

(72) Inventors: Sudhan Immanuel Godwin, Bangalore (IN); Aadesh Gupta, Bangalore (IN); Nihilesh K B, Coimbatore (IN); Ashok Kumar Kethe, Bangalore (IN); Niharica, Amritsar (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 18/954,986

(22) Filed: Nov. 21, 2024

(65) Prior Publication Data

US 2026/0140868 A1 May 21, 2026

(51) Int. Cl.
*G06F 12/02* (2006.01)
*G06F 13/16* (2006.01)

(52) U.S. Cl.
CPC ...... *G06F 12/0246* (2013.01); *G06F 13/1668* (2013.01); *G06F 2213/16* (2013.01)

(58) Field of Classification Search
CPC ............. G06F 12/0246; G06F 13/1668; G06F 2213/16
See application file for complete search history.

(56) References Cited

U.S. PATENT DOCUMENTS

| | | | |
|---|---|---|---|
| 8,331,123 | B2 | 12/2012 | Schuette |
| 8,879,349 | B2 | 11/2014 | Yoshii et al. |
| 9,208,068 | B2 | 12/2015 | Bang et al. |
| 9,350,125 | B2 | 5/2016 | Jones et al. |
| 9,577,392 | B2 | 2/2017 | Chang |
| 9,952,996 | B2 | 4/2018 | Hundal et al. |
| 10,268,618 | B2 | 4/2019 | Geva et al. |
| 10,289,584 | B2 | 5/2019 | Chiba |
| 10,459,865 | B2 | 10/2019 | Hundal et al. |
| 10,613,952 | B2 | 4/2020 | Gregg et al. |
| 11,281,399 | B2 | 3/2022 | K et al. |
| 2008/0034149 | A1 | 2/2008 | Sheen |

(Continued)

*Primary Examiner* — Eric T Oberly
(74) *Attorney, Agent, or Firm* — LOZA & LOZA, LLP; Gabriel Fitch

(57) ABSTRACT

A solid state device (SSD) includes two data storage controllers, each connected to a corresponding set of NAND chips. The SSD includes a Universal Serial Bus (USB)-C socket for receiving a USB-C plug in one of two mating orientations. One lane of the USB-C socket is connected to the first data storage controller. The second lane is connected to the second data storage controller. The two lanes are used for concurrent communications with a host, with lane communication protocols depending upon the mating orientation. In a first mating orientation, the first lane communication protocol may be USB 10 Gbps and the second lane communication protocol may be USB 2.0. In the second mating orientation, the protocols are reversed. The host thereby has concurrent access to both sets of NAND chips. Similar features are described for use with volatile memory devices such as dynamic random access memory (DRAM) devices.

19 Claims, 9 Drawing Sheets

(56) References Cited

U.S. PATENT DOCUMENTS

| | | | | |
|---|---|---|---|---|
| 2013/0205064 | A1 * | 8/2013 | Bang | G06F 3/0658 711/102 |
| 2016/0335206 | A1 * | 11/2016 | Moshayedi | G06F 13/28 |
| 2017/0161226 | A1 * | 6/2017 | Gerber | G06F 13/385 |
| 2021/0191896 | A1 * | 6/2021 | So | G06F 13/4282 |
| 2024/0146005 | A1 | 5/2024 | Menachem et al. | |

* cited by examiner

DATA STORAGE ACCESSIBLE BY A HOST USING DIFFERENT COMMUNICATION PROTOCOLS BASED ON THE MATING ORIENTATION OF A REVERSIBLE CONNECTOR

FIELD

The disclosure relates, in some aspects, to data storage devices such as solid state devices with non-volatile memory (NVM) arrays. More specifically, but not exclusively, the disclosure relates to solid state devices with Universal Serial Bus (USB) Type-C connectors.

INTRODUCTION

In consumer electronics, solid state drives (SSDs) or other data storage devices incorporating non-volatile memories (NVMs) are often replacing or supplementing conventional hard disk drives for mass storage. The non-volatile memories may include one or more flash memory devices, such as NAND flash memories. The NVMs may also include multiple NAND flash dies or chips that form the NVM. Other data storage devices employ volatile memory such as dynamic random access memory (DRAM). Within SSDs and other data storage devices, it is important to maximize drive capacity without significantly increasing costs or power consumption. Herein, systems, methods and apparatus are provided to that end.

SUMMARY

The following presents a simplified summary of some aspects of the disclosure to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device that includes a first data storage controller coupled to a first memory and coupled to a connector of the data storage device using a first connection lane that is coupled to a first configuration orientation pin of the connector, wherein the connector is configured to connect the data storage device to a host. The data storage device also includes a second data storage controller coupled to a second memory and coupled to the connector of the data storage device using a second connection lane that is coupled to a second configuration orientation pin of the connector. The first and second connection lanes are configured for concurrent communications with the host, with communications over the first connection lane configured in accordance with a first communication protocol and concurrent communications over the second connection lane configured in accordance with a second, different communication protocol. In the first mating orientation, the first communication protocol may be, e.g., USB 10 giga-bits per second (Gbps) or higher and the second communication protocol may be USB 2.0. In the second mating orientation, the first communication protocol may be USB 2.0 and the second communication protocol may be USB 10 Gbps or higher.

Another embodiment of the disclosure provides a method for use by a data storage device that includes a first data storage controller connected to a first memory, a second data storage controller connected to a second memory, and a first connector for connecting to a corresponding second connector for coupling to a host. The method includes: detecting a connection of the second connector with the first connector in a first mating orientation and, in response, enabling access by a host to the first memory under the control of the first data storage controller using a first communication protocol and enabling concurrent access by the host to the second memory under the control of the second data storage controller using a second, different communication protocol; detecting a disconnection of the second connector from the first connector and, in response, disabling access by the host to the first and second memories; and detecting a connection of the second connector with the first connector in a second mating orientation and, in response, enabling access by the host to the first memory under the control of the first data storage controller using the second communication protocol and enabling concurrent access by the host via the external cable to the second memory under the control of the second data storage controller using the first communication protocol.

Yet embodiment of the disclosure provides an apparatus for use with a data storage device having a first data storage controller connected to a first memory, a second data storage controller connected to a second memory, and a first connector for connecting to a corresponding second connector for coupling to a host. The apparatus includes: means for detecting a connection of the second connector with the first connector in a first mating orientation; means, operative in response to detecting the connection of the second connector with the first connector in the first mating orientation, for enabling access by a host to the first memory under the control of the first data storage controller with a first communication protocol; and means, also operative in response to detecting the connection of the second connector with the first connector in the first mating orientation, for enabling concurrent access by the host to the second memory under the control of the second data storage controller with a second, different communication protocol. The apparatus also includes: means for detecting disconnection of the second connector from the first connector and, in response, for disabling access by the host to the first and second memories. The apparatus further includes: means for detecting a connection of the second connector with the first connector in a second mating orientation; means, operative in response to detecting the connection of the second connector with the first connector in the second mating orientation, for enabling access by the host via the external cable to the first memory under the control of the first data storage controller using the second communication protocol; and means, also operative in response to detecting the connection of the second connector with the first connector in the second mating orientation, for enabling concurrent access by the host to the second memory under the control of the second data storage controller using the first communication protocol.

DETAILED DESCRIPTION

Figure 1:
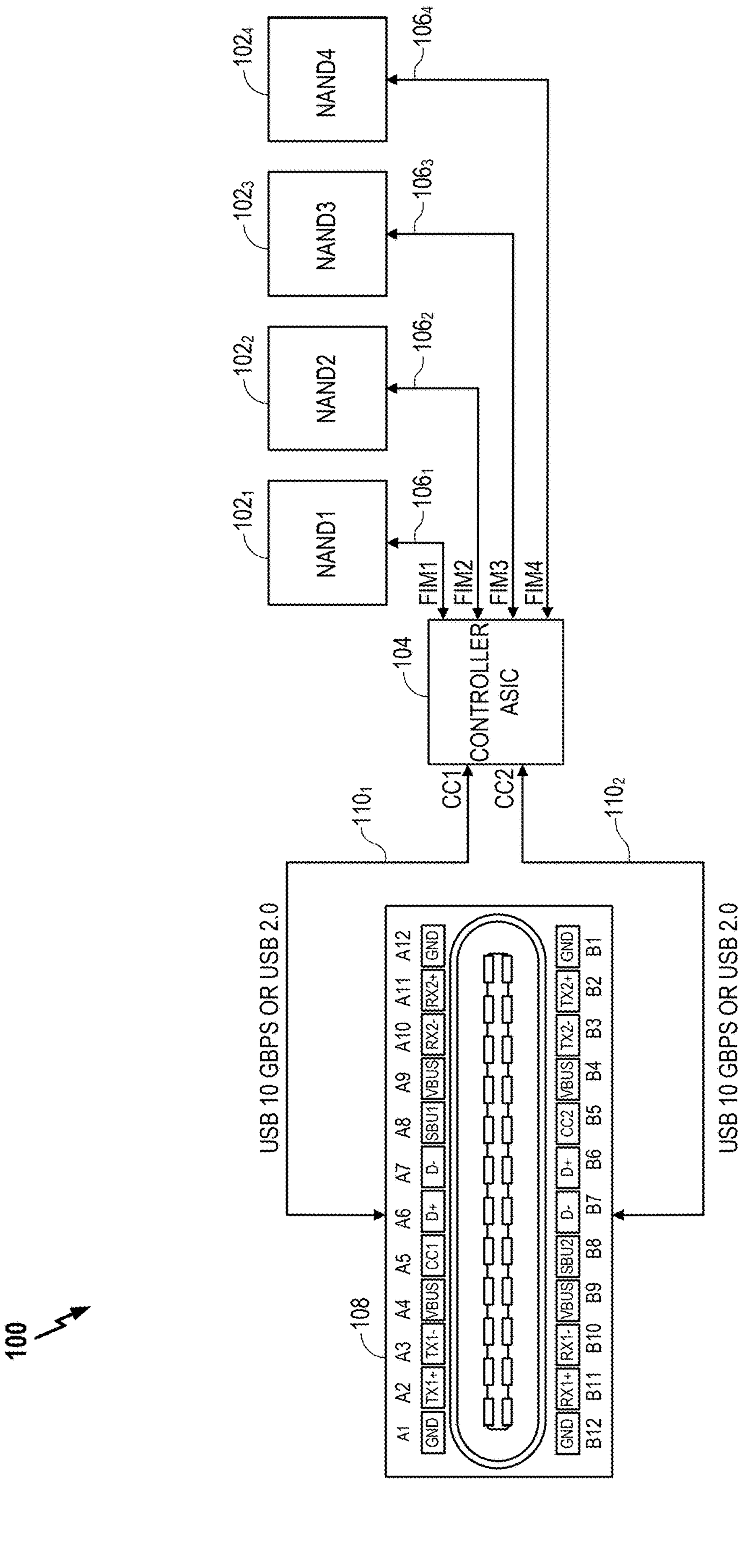
(PRIOR ART) FIG. 1
FIG. 1 is a schematic block diagram configuration for an exemplary solid state device (SSD) and USB-C connection port socket, according to the prior art.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Some aspects herein relate to portable data storage devices (DSD) having non-volatile memory (NVM), such as solid-state devices (SSDs), e.g., NAND flash memory storage devices (herein "NANDs"). (A NAND is a type of non-volatile storage technology that does not require power to retain data. It exploits negative-AND, i.e., NAND, logic.) To provide a concrete example, a portable SSD having one or more NVM NAND dies will be used below in the description of various embodiments. The SSD may be connected to a host via a flexible connection cable or may be configured as a thumb drive for directly mounting to a host such as a laptop computer or smart phone. It is understood that at least some aspects described herein may be applicable to other forms of SSDs as well. For example, at least some aspects described herein may be applicable to phase-change memory (PCM) arrays, magneto-resistive random access memory (MRAM) arrays, and resistive random access memory (ReRAM) arrays. Features may be implemented within a CMOS direct bonded (CBA) NAND chip or die (wherein CMOS refers to a complementary metal-oxide-semiconductor). Features may also be implemented within 3D XPoint memory cores, ferroelectric random-access memory (FeRAM) cores, and other types of memory cores. In some embodiments, one or more of the memory modules or portions thereof may be configured as other types of storage class memory (SCM).

Generally speaking, the memory modules may include any of a variety of Random Access Memory (RAM), dynamic RAM (DRAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

Additional aspects herein relate to SSDs configured for use with Universal Serial Bus (USB) Type-C (herein "USB-C") cables and connectors or similar reversible connectors. Notably, USB-C refers to the configuration of cables and connectors (i.e., the connection plugs and sockets). USB-C is not communication protocol. The USB-C connectors have two-fold rotational symmetry enabling a USB-C plug to be inserted into a corresponding USB-C socket (or receptacle) in either of two orientations. That is, the plugs and sockets have a physically symmetric pinout. Electrically, however, USB-C connectors are not symmetric and the two ends of a USB-C cable are electrically different due to the cable wiring. For the user standpoint, USB-C cables often appear symmetric because software within the devices that the cables interconnect are configured to make the plugs, sockets, and cables behave as though symmetric.

Various communication protocols are compatible with USB-C cables, including USB4. Under the USB4 standard, devices must support a data communication bit rate of at least 20 gigabits (Gbit/s or Gbps) (e.g., 10 Gbps for each of two concurrent lanes) and may enable rates of 40 Gbit/s (USB4 version 1.0) and 80 Gbit/s (USB4 version 2.0). USB4 is currently only defined for the USB-C connector. The USB4 standard mandates backwards compatibility to USB 2.0 and USB 3.x. USB 3.2 (aka USB 10 Gbps) provides for (or specifies) 10 Gbps transmission rates. USB 2.0 provides for (or specifies) 480 Mbps. Note that, herein, the USB-C cables used in the various embodiments are "Full-Featured" Type C cables compatible with USB4 and USB 3.x. There are also USB 2.0 Type-C cables compatible with only USB 2.0. Some aspects of the disclosure are also be compatible with other (non-USB) reversible connectors, as discussed below.

TABLE I lists current USB standards (versions or protocols) and connectors:

TABLE I

| USB Version | Max. Speed | Original USB Name | Current USB Name | USB Connectors |
|---|---|---|---|---|
| 1.1/1.0 | 12 Mbps | — | — | Type-A, Type-B |
| 2.0 | 480 Mbps | Hi-Speed USB | — | Type-A, Type-B, Type-C, Mini, Micro |

TABLE I-continued

| USB Version | Max. Speed | Original USB Name | Current USB Name | USB Connectors |
|---|---|---|---|---|
| 3.0 3.1 Gen 1/ 3.2 Gen 1 | 5 Gbps | SuperSpeed USB | USB 5 Gbps | Type-A, Type-B, Type-C, Micro |
| 3.1 Gen 2/ 3.2 Gen 2 | 10 Gbps | SuperSpeed USB 10 Gbps | USB 10 Gbps | Type-A, Type-C |
| 3.2 Gen 2 × 2 | 20 Gbps | SuperSpeed USB 20 Gbps | USB 20 Gbps | Type-C |
| USB4 | 20/40 Gbps | — | USB 20 Gbps/ USB 40 Gbps | Type-C |
| USB4 Version 2 (USB 2.0) | 80 Gbps | — | — | Type-C |

Overview

Data storage product capacities are often limited by memory technology limitations. In some SSD examples, using quad-level-cell (QLC) NAND technology, the maximum memory capacity of the SSD may be 8 Terabytes (TB). For example, the SSD may be configured with four NAND chips, each capable of storing 2 TB of data. The four 2 TB NAND chips are connected via four Flash Interface Module (FIM) channels to a single data storage controller, which may be configured as an application specific integrated circuit (ASIC).

Figure 2A:
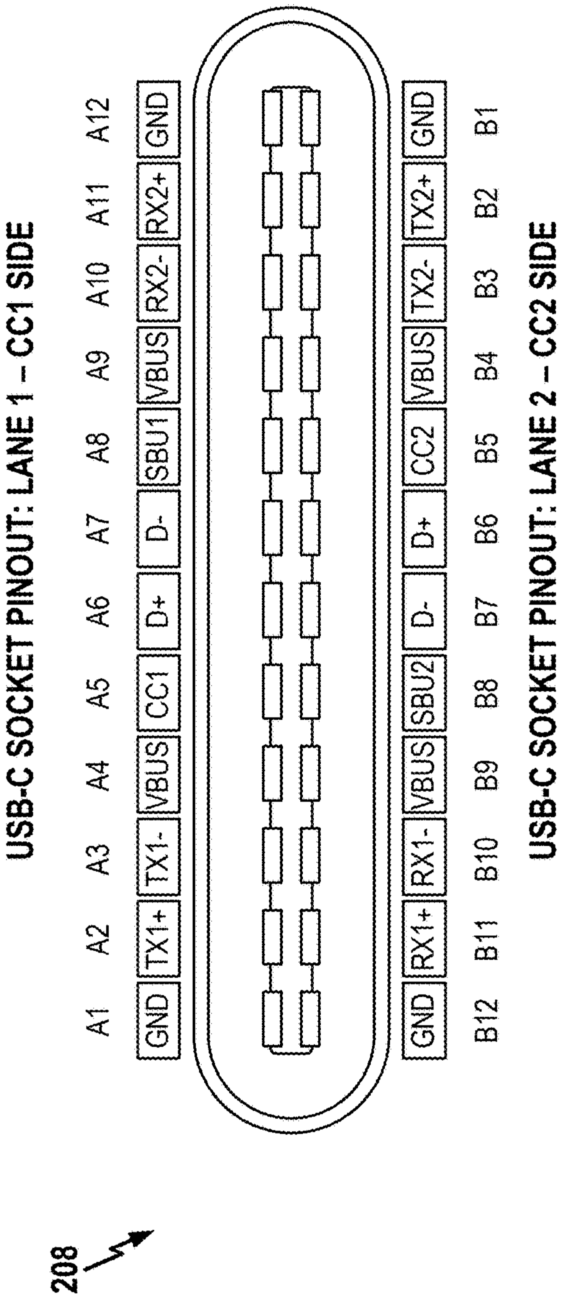
FIG. 2A (PRIOR ART)
FIG. 2A is a schematic diagram of a USB-C socket, according to the prior art.
Figure 2B:
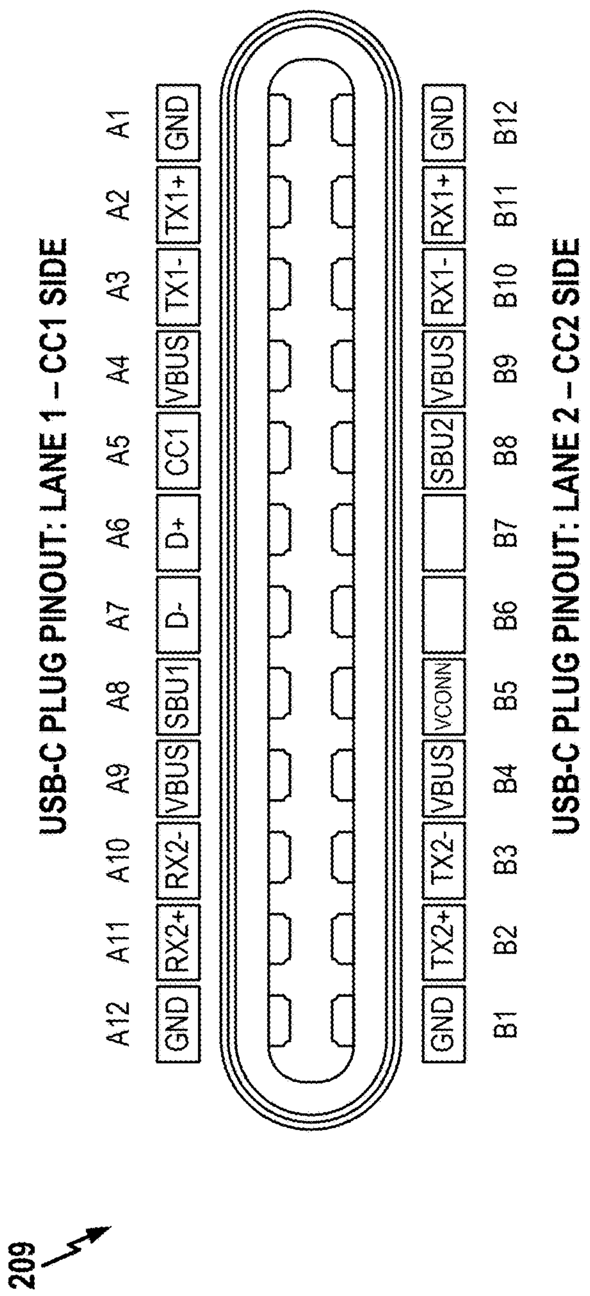
FIG. 2B (PRIOR ART)
FIG. 2B is a schematic diagram of a USB-C plug, according to the prior art.

FIG. 1 illustrates a prior art example of an SSD 100 with four NAND chips $102_1$-$102_4$ connected to a data storage controller 104 via four FIM channels $106_1$-$106_4$. The SSD 100 also includes a USB-C connector socket (or receptable) 108 that accommodates two communication lanes. (See, also, FIG. 2 for an enlarged view of the USB-C connector socket pinout.) A first communication lane $110_1$ is connected from the data storage controller 104 to a first row of pins of the USB-C connector socket 108. A second communication lane $110_2$ is connected from the data storage controller 104 to a second row of pins in the USB-C connector socket 108. Although not shown in FIG. 1, the data storage controller 104 includes frontend components that implement a USB-C-compatible protocol (such as USB 10 Gbps) for use with the USB-C connector socket 108 and backend components that interface with the FIM channels that connect to individual NAND chips $102_1$-$102_4$ of the SSD for storing (programming) data to the NAND chips and for reading (sensing) out data from the NAND chips. In other examples, the frontend components may be configured to operate at other rates, such as 12 Mbps, 480 Mbps, or 5 Gbps. Thus, the rate of 10 Gbps is just one example.

The data storage controller 104 of FIG. 1 is configured to provide a throughput of 10 Gbps from the NAND chips to an external host via the USB-C connector socket and a USB-C cable via either the first lane or the second lane, depending upon the orientation of the USB-C connector plug that is inserted into the USB-C connector socket. That is, the exemplary SSD 100 of FIG. 1 is not capable of 20 Gbps data transfer, even though the USB-C cable and the host may be capable of 20 Gbps data transfer (or even higher rates, such as 40 Gbps or 80 Gbps). The SSD 100 of FIG. 1 is capable of only 10 Gbps, either using lane $110_1$ or lane $110_2$, because its data storage controller and its FIM channels are only capable of a maximum of 10 Gbps (e.g., they are configured for use with USB 10 Gbps). To accommodate 20 Gbps, the SSD would require more expensive components that require more power and generate more heat, such as data storage controller ASICs configured for use with USB4 rather than USB 10 Gbps. Thus, SSD 100 of FIG. 1 is capable of either transferring data at 10 Gbps via lane $110_1$ or transferring data at 10 Gbps via lane $110_2$, but not both concurrently. The SSD 100 of FIG. 1 is also provided with only a total of four NAND chips providing 8 TB of memory.

FIG. 2 provides an enlarged view of a conventional USB-C connector socket 208, which is configured to receive a USB-C connector plug 209 of an external USB-C cable that may be connected into a host, such as a laptop computer of a user. The USB-C connector socket 208 has a physically symmetric pinout with two sets of signal pins, one on the top row and one on the bottom row, that are physically aligned with one another so the USB-C connector plug can be inserted into the USB-C connector socket 208 in either of two opposite mating orientations. As such, the USB-C connector plug is reversible and can be removed from the USB-C connector socket 208, its orientation flipped, then re-inserted into the USB-C connector socket 208 and it will again fit. However, the pinout of the USB-C connector socket 208 and the corresponding USB-C connector plug 209 are not electrically symmetric.

The electrical interface provided when the USB-C connector plug 209 is inserted in one orientation differs from the electrical interface provided when the USB-C connector plug 209 is inserted in the opposite orientation. Notably, one set of pins (e.g., the upper set) in the socket 208 has a configuration channel 1 (CC1) pin and the other set in the socket 208 (e.g., the lower set) has a CC2 pin. However, in the corresponding plug 209, the pinout includes only a single CC pin (CC1). There is no corresponding CC2 pin in the plug. As such, either the CC1 of the plug is connected to the CC1 of the socket (with the CC2 of the socket not connected to a corresponding CC pin) or the CC1 of the plug is connected to the CC2 of the socket (with the CC1 of the socket not connected to a corresponding CC pin). This enables the host and the SSD to detect the orientation of the USB-C connector plug to enable the correct lane for communication (i.e., lane $110_1$ or $110_2$ of FIG. 1). If CC1 of the plug is electrically connected to the CC1 of the socket, the first lane $110_1$ is enabled and used for communication. If the USB-C connector plug is reversed, CC1 of the plug is electrically connected to CC2 of the socket and the second lane $110_2$ is enabled and used for communication. (Note that the VCONN pin of the USB-C plug can also function as a configuration channel pin. Thus, if the SSD has a plug, rather than a socket, one of the lanes of the SSD can be connected to the CC1 of the plug while the other lane of the SSD can be connected to the VCONN pin. Thus, herein, the VCONN pin is also considered to be a configuration orientation pin.)

Thus, when using the SSD of FIG. 1, the user of the host can access the four NAND chips (for a total of 8 TB of memory) via either the first or second lanes ($110_1$ and $110_2$). From the user's point of view, the orientation of the USB-C connector plug does not matter and so the plug can be inserted in either orientation. However, the SSD is provided with only 8 TB of total memory. It would be desirable to instead provide an SSD with 16 TB of memory, yet without requiring the provision of a more expensive and more power consuming (and more heat generating) data storage controller equipped to accommodate the 16 TB of memory. In the following, a solution to this problem is provided.

Briefly, an SSD is described herein that includes two (relatively inexpensive) data storage controller ASICs, each configured to accommodate a total memory space of 8 TB with a data transfer throughput of 10 Gbps (e.g., USB 10 Gbps) or a lower rate such as 480 Mbps of USB 2.0. A first set of four 2 TB NAND chips is coupled to a first data storage controller, and a second set of four 2 TB NAND chips is coupled to a second data storage controller, for a total of 16 TB, thus doubling the capacity of the SSD of FIG. 1. One lane of the USB-C connector socket is connected to the first data storage controller and its corresponding NANDs. The second lane of the USB-C connector socket is connected to the second data storage controller and its corresponding NANDs. At any given time, depending upon the mating orientation of the plug in the socket, only one of the two CC pins (CC1 or CC2) of the socket is connected to the corresponding CC1 pin of the plug to enable either the first lane or the second lane to be active for 10 Gbps signaling. Thus, only one of the two sets of NAND chips is accessible at 10 Gbps to the user via the host.

However, the other one of the data storage controllers can currently transfer data at 480 Mbps in accordance with USB. 2.0. Referring again to FIGS. 2A and 2B, the USB-C socket pinout includes two pairs of TX/RX and two pairs of D+/D−, as well as the two CC pins. For a single lane operation (USB 10 Gbps), only one set of the pins are used. The CC pins (CC1 and CC2) are used to detect the orientation of the cable and enable the correct lane for communication. Note that the USB-C plug includes only one D+/D− pair, which is on lane 1. Upon connecting the SSD with the USB-C cable (which connects the SSD with the host), there is only one lane of D+ and D− travelling inside the cable, unlike TX and RX. This lane is used for USB 2.0 communications while USB 10 Gbps communications are concurrently performed.

Thus, in some aspects, one lane within the SSD is used for USB 10 Gbps (via one of the two data storage controllers) while the other lane uses USB 2.0 (via the other of the two data storage controllers), allowing for concurrent transmissions of data at 10 Gbps and at 480 Mbps. Depending upon the mating orientation of the plug in the socket, either lane 1 is used for 10 Gbps and lane 2 is used for at 480 Mbps, or lane 1 is used for 480 Mbps and lane 2 is used for 10 Gbps. When the user connects the SSD in the first mating orientation, lane 1—which connects to the first data storage controller and its NANDs on "side 1" of the SSD—is enabled for access by the host to the first set of NAND chips at 10 Gbps. Concurrently, lane 2—which connects to the second data storage controller and its NANDs on "side 2" of the SSD—is enabled for access by the host to the second set of NAND chips at 480 Mbps via USB 2.0. If the user flips the USB-C connection plug (or flips the SSD itself) and re-connects the SSD to the host, lane 2 is enabled for access to the second set of NAND chips by the host at 10 Gbps. Concurrently, lane 1 is enabled for access to the first set of NAND chips by the host at for 480 Mbps via USB 2.0. That is, a flip of the USB-C connector plug within the SSD's USB-C connector socket enables the user to switch the storage space access speeds when accessing the two 8 TB memory spaces. The total 16 TB of storage space is accessible in either case.

The SSD may be connected to a host via a cable or the SSD might be configured as a thumb drive (or memory stick, pen drive, etc.) for directly attaching to a host, depending upon the particular communication protocol or interface. (For USB-C, since the pinout of a USB-C plug is different from the pinout of a USB-C socket, some of the devices and procedures described herein might not work with a thumb drive configured with only a USB-C plug. This may depend on whether the plug is provided with two pairs of D+ and D− pins, as with the socket. For other interfaces besides USB-C, such as Thunderbolt 4, at least some of the devices and procedures described herein may work for a thumb drive, depending upon the particular pinouts of the plug.) If a cable is used, the cable may be flipped and then re-inserted into the socket of the SSD. If the SSD is configured as a thumb drive, the thumb drive itself may be disconnected from the host, flipped, and then reattached. Note also that the USB2.0 (480 Mbps) lane/protocol could also be USB1.1 (12 Mbps). That is, USB2.0/1.1. Similarly, the 10 Gbps could instead be 5 Gbps. That is, the USB 2.0/USB 10 Gbps configuration is just one example.

Further, in some aspects, background data transfers may be performed to one of the sets of NAND chips at USB 2.0 while the user accesses the other set of NAND chips at 10 Gbps, e.g., for computer gaming or the like. In still other aspects, automatic data backups from the host may be performed in the background via data transfers to one of the sets of NAND chips at USB 2.0 while the user accesses the other set of NAND chips at 10 Gbps. Herein, a background transfer refers to the transmission of data during non-busy periods. (For example, a metric may be defined that represents how busy or active a computing system is for comparison against a threshold. If the metric is below the threshold, background data transfers may be performed between host and SSD. The metric may be based, e.g., on the percentage of a CPU utilization percentage.) For example, a custom application may be deployed on various platforms that performs a background auto-backup of data from selected folders on a host to the SSD via a USB2.0/8 TB partition. In some aspects, the USB2.0/8 TB partition may be hidden from the user and only the other 8 TB partition (accessible via USB 10 Gbps) is exposed to the user for data transfers. The power circuitry in the SSD may be configured to control power based on the mating configuration. For example, the data storage controller that is connected to the lane operating at USB 2.0 may be delivered reduced power as compared to the data storage controller that is connected to the lane operating at USB 10 Gbps. Power reduction is optional. In other examples, both data storage controllers and their respective NANDs remained fully powered-up. In still other aspects, the host may be notified to inform the user that the different connection speeds may be obtained by flipping the mating orientation.

In this manner, 16 TB of memory space is provided to the user without requiring the use of more expensive data storage controller ASICs and, in some examples, without consuming significantly more power or generating significantly more heat.

In some examples, a portable SSD may be provided that can be easily flipped by the user to access a different "side" of the SSD (via reinsertion the USB-C connection plug in the opposite orientation) to mimic the manner by which one flips a record to listen to a different side of the record. The SSD may have, for example, different graphics on one side of the SSD compared to the other side surface, or may have different colors (e.g., red vs blue). This helps emphasize to the user that there are two separate memory spaces that are accessible concurrently at different connection speeds. In one aspect, one side of the SSD may be used for high speed transference of personal data (e.g., videos, computer game data, etc.), while the other side may be used for low speed transference of work data (e.g., spreadsheets, etc.). The file explorer in the host may be configured to shows two drives (e.g., a first 8 TB "drive" accessible via USB 10 Gbps and a second 8 TB drive accessible via USB 2.0) in addition to the local disk C of the host (which includes the host's operating system).

These and other features will be described in detail in the following sections.

Exemplary SSD with Two Separate Memory Spaces and Memory Controllers

Figure 3:
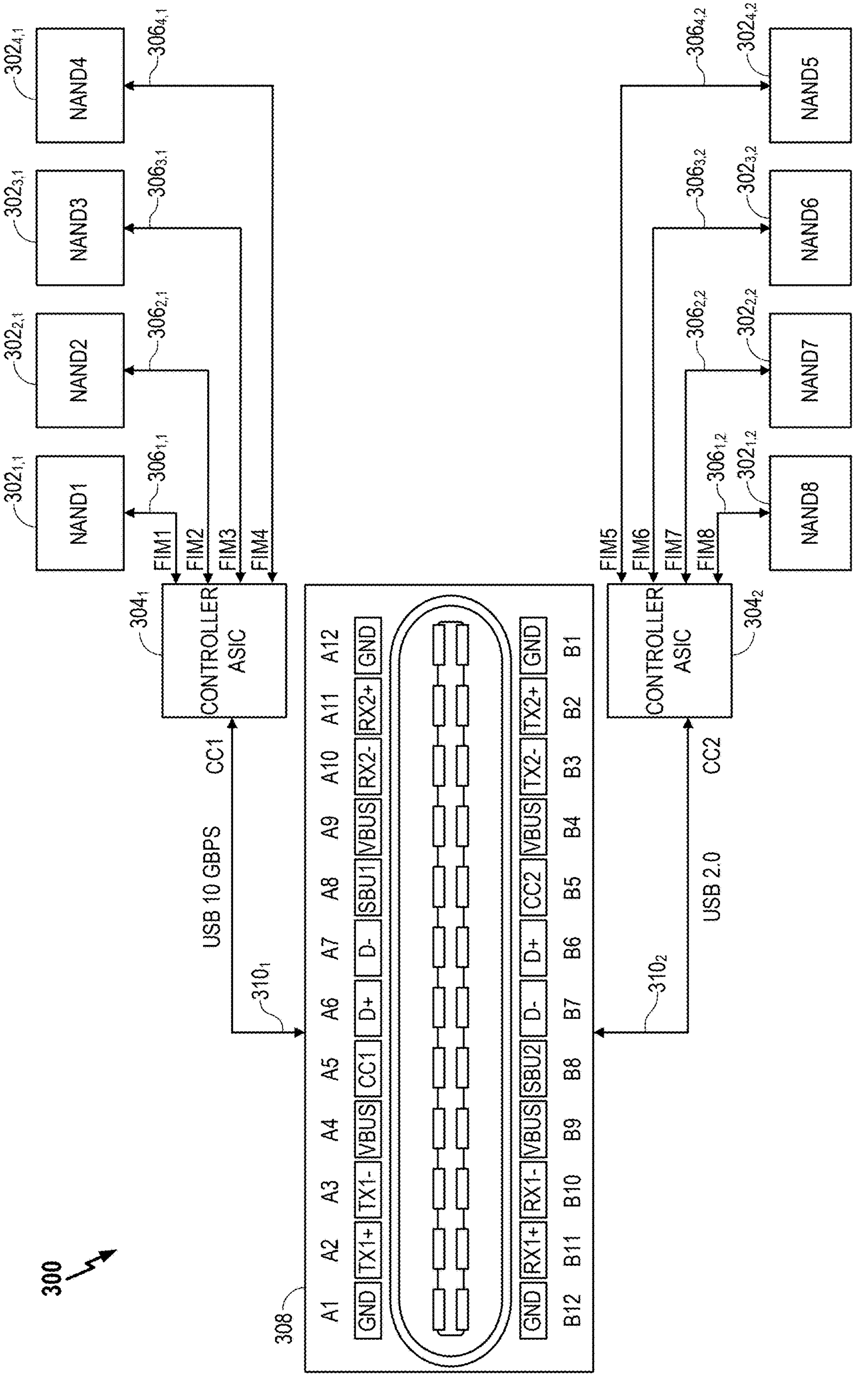
FIG. 3 is a schematic block diagram of an exemplary SSD and USB-C connection port socket, wherein the SSD has dual memory spaces or partitions and dual data storage controllers, with concurrent communication enabled with a host over dual connection lanes with different communication protocols depending upon the USB-C plug/socket mating orientation, in accordance with aspects of the present disclosure.

FIG. 3 illustrates an SSD 300 configured in accordance with aspects of the present disclosure wherein two data storage controllers are provided, each connected to four NAND chips, thus providing a total memory capacity of 16 TB. SSD 300 has a first set of four NAND chips $\mathbf{302}_{1,1}$-$\mathbf{302}_{4,1}$ connected to a first data storage controller $\mathbf{304}_1$ via four FIM channels $\mathbf{306}_{1,1}$-$\mathbf{306}_{4,1}$. The SSD 300 also includes a USB-C connector socket (or receptable) 308 (see, again, FIG. 2) that accommodates two communication lanes. A first communication lane $\mathbf{310}_1$ is connected from the data storage controller $\mathbf{304}_1$ to a first row of pins of the USB-C connector socket 308. The second communication lane $\mathbf{310}_2$ is connected to a second data storage controller $\mathbf{304}_2$ via a second row of pins in the USB-C connector socket 308. The second data storage controller $\mathbf{304}_2$ is connected to a second set of four NAND chips $\mathbf{302}_{1,2}$-$\mathbf{302}_{4,2}$ via four FIM channels $\mathbf{306}_{1,2}$-$\mathbf{306}_{4,2}$. Although not shown in FIG. 3, each of the two data storage controllers $\mathbf{304}_1$, $\mathbf{304}_2$ includes frontend components that implements at least two USB-C-compatible protocols (such as USB 10 Gbps and USB 2.0) for use with the USB-C connector socket 308 and backend components that interface with the corresponding FIM channels that connect to the corresponding NAND chips of the SSD for storing (programming) data to the NAND chips and for reading out (sensing) data from the NAND chips.

The two data storage controllers $\mathbf{304}_1$, $\mathbf{304}_2$ of FIG. 3 are each configured to provide a throughput of either 10 Gbps or 480 Mbps from the NAND chips to an external host via the USB-C connector socket and a USB-C cable via its corresponding lane. However, only one of the two lanes $\mathbf{310}_1$, $\mathbf{310}_2$ is enabled at any given time for USB 10 Gbps based on the mating orientation of the USB-C connector plug (see, again, FIG. 2) in the USB-C connector socket 308, while the other of the two lanes is enabled for USB 2.0 480 Mbps. The CC pins (CC1 and CC2) of the USB-C connector socket 308 are used by the host and the SSD 300 to detect the orientation of the USB-C connector plug to enable a particular lane for 10 Gbps communication (i.e., lane $\mathbf{310}_1$ or $\mathbf{310}_2$) while the other lane is enabled for concurrent 480 Mbps communication. As noted above, when the USB-C plug is inserted, only one of the two CC pins in the USB-C socket is electrically connected to the host. If CC1 is electrically connected, then the first lane $\mathbf{310}_1$ is enabled for USB 10 Gbps (as shown) and NAND chips $\mathbf{302}_{1,1}$-$\mathbf{302}_{4,1}$ are accessible to the host at that speed, while the other lane $\mathbf{310}_2$ is enabled for USB 2.0 (as shown) and NAND chips $\mathbf{302}_{1,2}$-$\mathbf{302}_{4,2}$ are accessible to the host at the slower speed of 480 Mbps. If the USB-C connector plug is reversed (flipped), then CC2 is electrically connected and the second lane $\mathbf{310}_2$ is enabled for USB 10 Gbps and NAND chips $\mathbf{302}_{1,2}$-$\mathbf{302}_{4,2}$ are accessible to the host at that speed, while the other lane $\mathbf{110}_1$ is enabled only for USB 2.0 and NAND chips $\mathbf{302}_{1,1}$-$\mathbf{302}_{4,1}$ are accessible to the host at that slower speed. (This alternative configuration where lane 1 is USB 2.0 and lane 2 is USB 10 Gbps is not shown in FIG. 3.) Note also that the USB2.0 (480 Mbps) lane/protocol could also be USB1.1 (12 Mbps). That is, USB2.0/1.1. Similarly, the 10 Gbps could instead be 5 Gbps. That is, the USB 2.0/USB 10 Gbps configuration is just one example.

Notably, both data storage controller $\mathbf{304}_1$ and data storage controller $\mathbf{304}_2$ can be relatively inexpensive data storage controller ASICs configured to use with a maximum of four FIMs at a maximum throughput of 10 Gbps. Moreover, in some examples, whichever data storage controller is currently being used for USB 2.0 can use reduced power to reduce overall power consumption and reduce heat. If the USB-C connector plug is then reversed by the user, the opposite lane is enabled, and so the data storage controller that was being given reduced power is powered up, whereas the other data storage controller is a now given reduced power. In some examples, one set of NAND chips may be used by a user for personal data (e.g., videos, computer game data, etc.), while the other set of NAND chips may be used for work data (e.g., spreadsheets, etc.) In other examples, one set of NAND chips may be used by the user for primary data storage while the other set of NAND chips may be used for data backup.

As noted above, one set of NAND chips may be regarded as representing one "side" of the SSD, whereas the other set of NAND chips may be regarded as representing the other "side" of the SSD. To access a first side of the SSD using USB 10 Gbps, the USB-C plug is inserted into the USB-C socket in one orientation. To access the other side of the SSD at USB 10 Gbps, the USB-C plug may be removed, the SSD flipped up-side-down, and then the plug is reinserted into the USB-C socket. Alternatively, the USB-C plug is flipped, then reinserted.

Figure 4A:
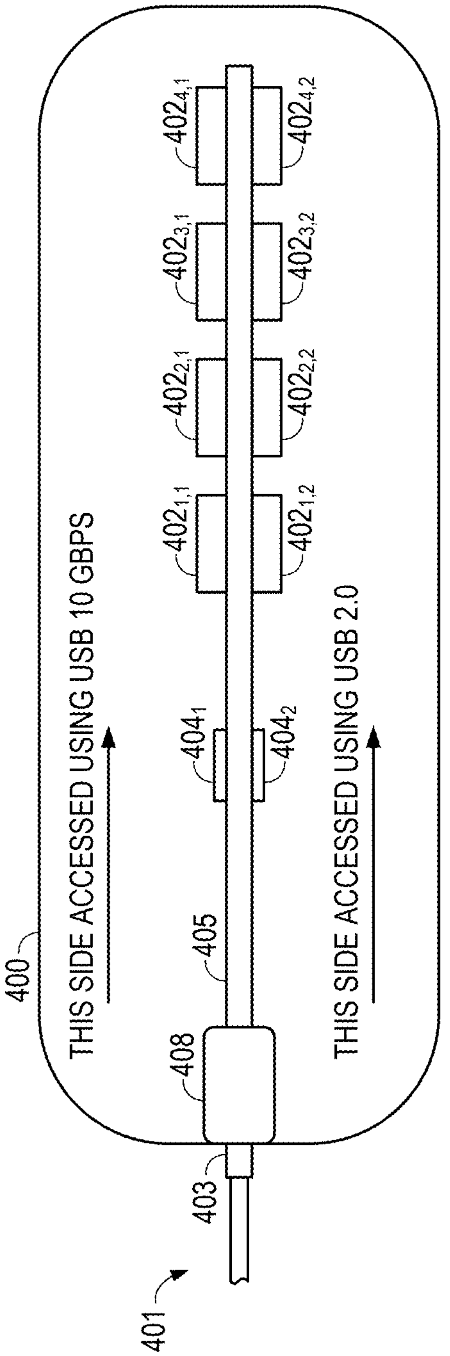
FIG. 4A is a schematic diagram of an SSD with a USB-C plug/pocket in a first mating orientation that provides access by the host to a first memory partition via the USB 10 Gigabits-per-second (Gbps) communication protocol and to a second memory partition via the USB 2.0 communication protocol, in accordance with aspects of the present disclosure.
Figure 4B:
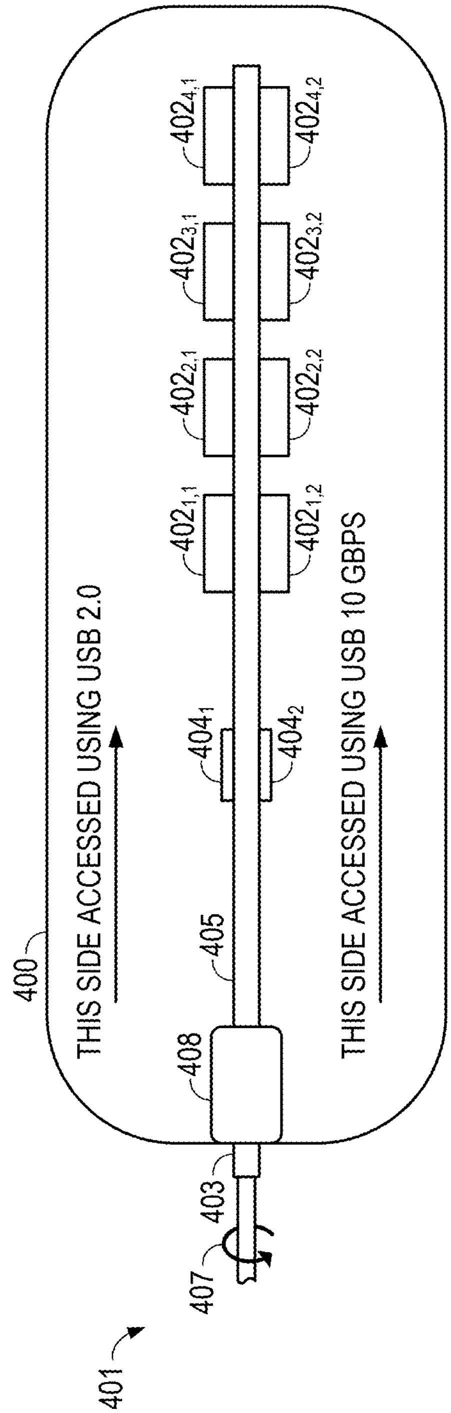
FIG. 4B is a schematic diagram of an SSD with the USB-C plug/pocket in a second, opposite mating orientation that provides access by the host to the first memory partition via USB 2.0 and to the second memory partition via a USB 10 Gbps, in accordance with aspects of the present disclosure.

FIGS. 4A and 4B further illustrate how one "side" or the other of an SSD may be accessed using USB 10 Gbps while the other side is accessed using USB 2.0, either by flipping the USB-C cable plug and then reinserting the plug into the SSD or, equivalently, by flipping the SSD and then reinserting he USB-C cable plug into the SSD.

FIG. 4A illustrates an SSD 400 with a USB-C cable 401 having a USB-C cable plug 403 inserted into a USB-C cable socket 408. Although not shown in the figure, the opposite end of the USB-C cable 401 is connected into a host. In the orientation of FIG. 4A, a data storage controller $\mathbf{404}_1$ is enabled to provide access by the host to a first set of NAND chips $\mathbf{402}_{1,1}$-$\mathbf{402}_{4,1}$ with data transfers to/from the host performed using USB 10 Gbps while a data storage controller $\mathbf{404}_2$ is enabled to provide access by the host to a second set of NAND chips $\mathbf{402}_{1,2}$-$\mathbf{402}_{4,2}$ with data transfers to/from the host performed using USB 2.0. Note that the figure shows a central bar 405 that conceptually represents various connection lanes, busses and/or FIMs that interconnect the various components. Notably, as explained above, separate FIMs and connection lanes are provided for the two separate data storage controllers and their corresponding NAND chips. For clarity, the separate lanes, FIMS, etc., are omitted.

FIG. 4B illustrates the SSD 400 with the USB-C cable 401 flipped (as shown by arrow 407) with its USB-C cable plug 403 inserted into the USB-C cable socket 408 in the opposite orientation. In the configuration of FIG. 4B, data storage controller $\mathbf{404}_2$ is enabled to provide access by the host to the first set of NAND chips $\mathbf{402}_{1,2}$-$\mathbf{402}_{4,2}$ with data transfers to/from the host performed using USB 10 Gbps while data storage controller $\mathbf{404}_1$ is enabled to provide access by the host to the first set of NAND chips $\mathbf{402}_{1,1}$-$\mathbf{402}_{4,1}$ with data transfers to/from the host performed using USB 2.0. Alternatively, the SSD itself may be flipped, with the USB-C cable plug reinserted so as to flip the orientation of the plug in the socket without flipping the plug. Note that, in some examples, the first side of the SSD (i.e., NAND chips $\mathbf{402}_{1,1}$-$\mathbf{402}_{4,1}$) may be used for storing work (or official data) such as spreadsheets, filed, etc., whereas the other side of the SSD (i.e., NAND chips $\mathbf{402}_{1,2}$-$\mathbf{402}_{4,2}$) may be used for storing personal data such as videos, movies, etc.

Figure 5A:
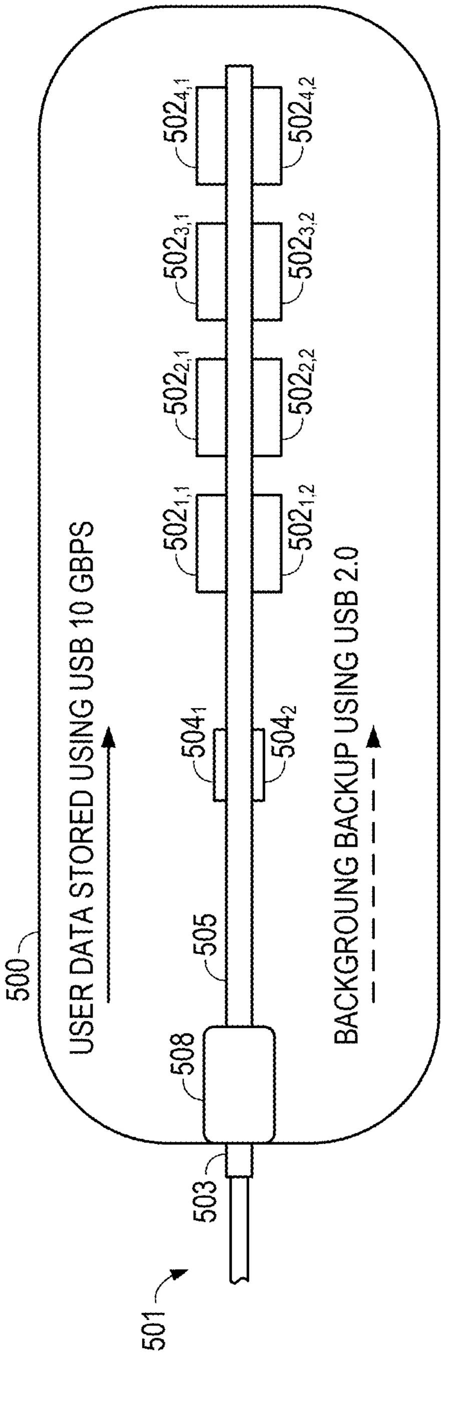
FIGS. 5A and 5B are schematic diagrams of an SSD with a USB-C plug/pocket, illustrating a use case wherein a background backup is performed with the speed of the backup depending upon the mating orientation, in accordance with aspects of the present disclosure.
Figure 5B:
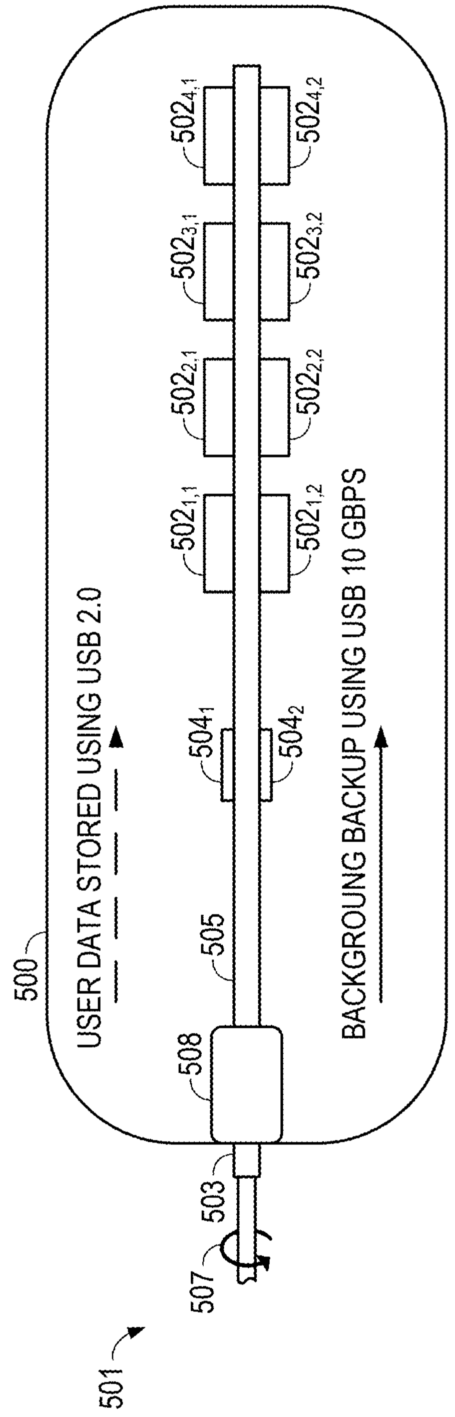

FIGS. 5A and 5B illustrates a use case in which one side of an SSD may be used by user for storing data using USB 10 Gbps while, concurrently, an automatic background backup of host data is performed the other side of the SSD using USB 2.0. In some examples, the host does not show the second (side 2) partition of the drive within the file explorer of the host, only the side 1 partition. In other examples, both partitions are shown. As noted above, a custom application may be deployed on various platforms that performs a background auto-backup of data from selected folders on a host to the SSD via USB2.0.

FIG. 5A illustrates an SSD 500 with a USB-C cable 501 having a USB-C cable plug 503 inserted into a USB-C cable socket 508. Although not shown in the figure, the opposite end of the USB-C cable 501 is connected into a host operator by a user. In the orientation of FIG. 5A, a data storage controller $\mathbf{504}_1$ is enabled to provide access by the user at 10 Gbps to a first set of NAND chips $\mathbf{502}_{1,1}$-$\mathbf{502}_{4,1}$ for storage of data that may be, e.g., work data, personal data, or a combination of both. Concurrently, an automatic background backup is performed by the host using USB 2.0 to a second set of NAND chips $\mathbf{502}_{1,2}$-$\mathbf{502}_{4,2}$. This backup may be transparent to the user who is only made aware by the host OS of the first partition corresponding to NAND chips $\mathbf{502}_{1,1}$-$\mathbf{402}_{4,1}$. In other examples, the user is made aware of the partition/backup, as well as the backup speed of 480 Mbps.

FIG. 5B illustrates the SSD 500 with the USB-C cable 501 flipped (as shown by arrow 507) with its USB-C cable plug 503 inserted into the USB-C cable socket 508 in the opposite orientation. In the configuration of FIG. 5B, access by the user to the first partition NAND chips $\mathbf{502}_{1,1}$-$\mathbf{502}_{4,1}$ is only at 480 Mbps, while the backup is performed to the second partition NAND chips $\mathbf{502}_{1,2}$-$\mathbf{502}_{4,2}$ at 10 Gbps. This may be appropriate if, for example, the user wants to provide a very fast backup (10 Gbps) and does not currently need fast access to the data within the first partition NAND chips $\mathbf{502}_{1,1}$-$\mathbf{502}_{4,1}$. The figures show a central bar 505 that conceptually represents various connection lanes, busses and/or FIMs that interconnect the various components. The separate lanes, FIMS, etc., are omitted in FIGS. 5A and 5B.

Note also that the host devices described herein may be referred to as having a Downstream Facing Port (DFP), i.e. a USB port functioning as a host and power source. The SSDs described herein may be referred to as having an Upstream Facing Port (UFP), i.e., a USB port serving as a client and power sink. At least some aspects of the disclosure may also be applicable to a Dual Role Device (DRD), which is capable of functioning as either a host or client (and formerly referred to as an on-the-go (OTG) device). At least some aspects of the disclosure may also be applicable to Dual Role Power (DRP) devices, i.e., devices capable of operating as either a power provider or power consumer. Note also that the CC pins discussed above not only enable detection of cable orientation (mating orientation), the pins enable identifying device roles to prevent damage and define communication hierarchy, and enable negotiating of power configurations between client and host devices for power distribution.

Co-pending U.S. patent application Ser. No. 18/954,904, filed contemporaneously herewith, entitled "DATA STORAGE DEVICE WITH DUAL MEMORY SPACES ENABLED BASED ON THE MATING ORIENTATION OF REVERSIBLE CONNECTOR,", and assigned to the assignee of the present application, is fully incorporated by reference herein for all purposes, and it should be understood that various features and inventions of the present application and the co-pending application can be practiced together. By way of example and not limitation, an SSD may be provided that is configured to either (a) enable concurrent operation of both data storage controllers and connection lanes to permit, e.g., USB 10 Gbps protocol data transfers via one of the connection lanes and simultaneous 480 Mbps USB 2.0 protocol transfers via the other of the connection lanes or (b) fully disconnect one of its data storage controllers and connection lanes depending upon the mating orientation of the USB-C plug as described in the co-pending application.

Additional Exemplary SSDs

Figure 6:
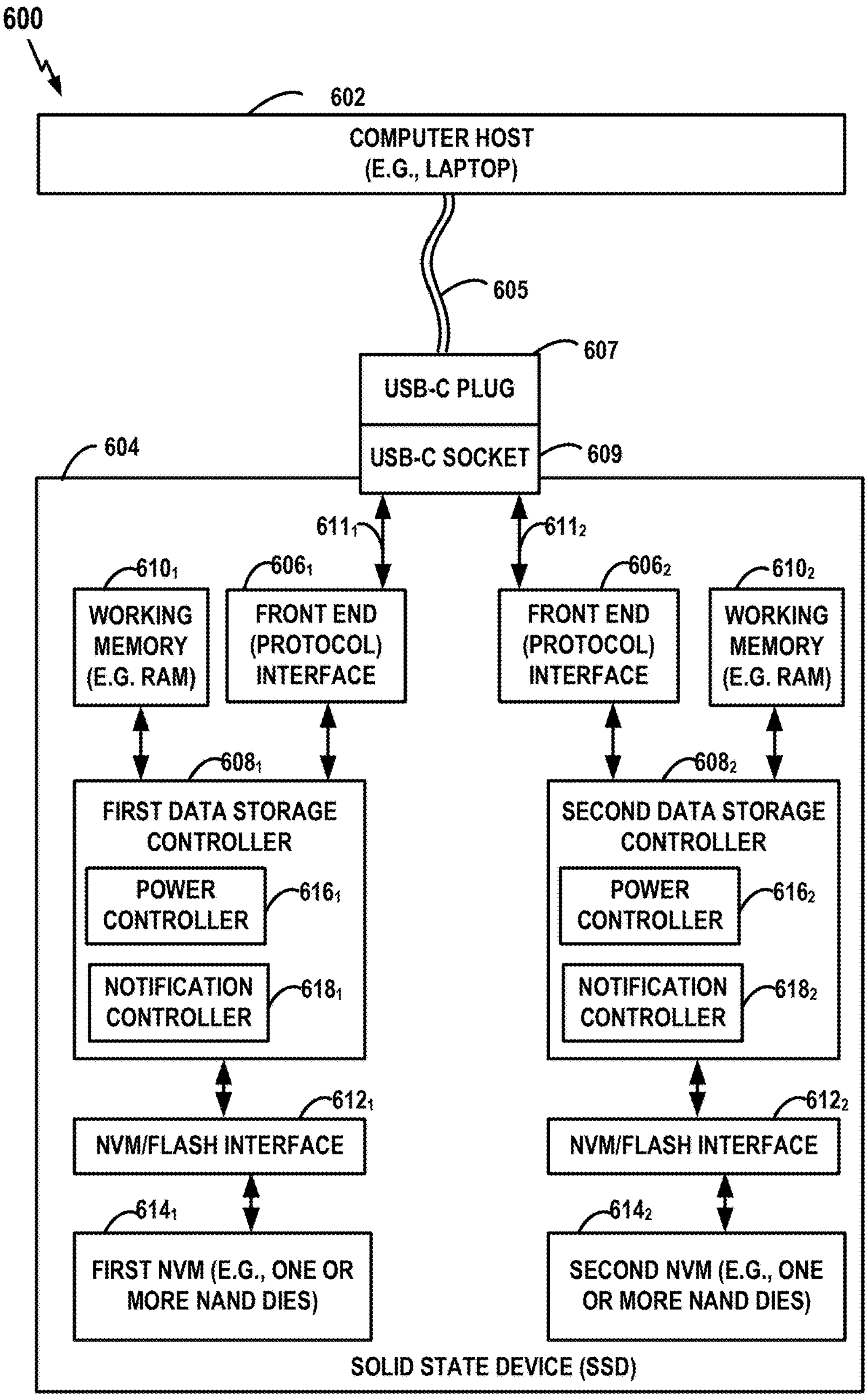
FIG. 6 is a block diagram of a system including a host, a USB-C connection cable, and an SSD, wherein the SSD has dual memory spaces and dual data storage controllers, wherein concurrent communication enabled with a host over dual connection lanes with different communication protocols depending upon the USB-C plug/socket mating orientation, in accordance with aspects of the present disclosure.

FIG. 6 is a block diagram of a system 600 including an exemplary computer host 602 (e.g., a laptop) and a solid state device (SSD) 604 configured with two data storage controllers and two NVM arrays. The host 602 is connected to the SSD 604 using an external USB-C connection cable 605 having a USB connection plug 607 for insertion into a USB-C connection socket 609 of the SSD in one of two mating orientations (as explained above).

The SSD 604 is configured to provide concurrent access to both the first and the second NVM array by the computer 602 with the connection speed/protocol depending upon the mating orientation. For example, in the first mating orientation, in which a first data storage controller $\mathbf{608}_1$ and a first NVM array $\mathbf{614}_1$ are communicatively coupled to the host 602 using USB 10 Gbps, the host 602 may provide a write command to the SSD 604 for writing user data to NVM $\mathbf{614}_1$ or a read command for reading user data from the NVM $\mathbf{614}_1$, with access by the host 602 to the NVM $\mathbf{614}_1$ under the control of data storage controller $\mathbf{608}_1$. Concurrently, the host 602 may provide a write command to the SSD 604 for writing user data to NVM $\mathbf{614}_2$ or a read command for reading user data from the NVM $\mathbf{614}_2$, with USB 2.0 access by the host 602 to the NVM $\mathbf{614}_2$ under the control of data storage controller $\mathbf{608}_2$.

In the second mating orientation, in which the second data storage controller $\mathbf{608}_2$ and the second NVM array $\mathbf{614}_2$ are communicatively coupled to the host 602 using USB 10 Gbps, the host 602 may provide a write command to the SSD 604 for writing user data to NVM $\mathbf{614}_2$ or a read command for reading user data from the NVM $\mathbf{614}_2$, with access by the host 602 to the NVM $\mathbf{614}_2$ under the control of data storage controller $\mathbf{608}_2$. Concurrently, the host 602 may provide a write command to the SSD 604 for writing user data to NVM $\mathbf{614}_1$ or a read command for reading user data from the NVM $\mathbf{614}_1$, with USB 2.0 access by the host 602 to the NVM $\mathbf{614}_1$ under the control of data storage controller $\mathbf{608}_1$.

The SSD 604 includes a front end (protocol) interface $\mathbf{606}_1$ for interfacing with host 602 via the USB-C-compatible protocol using a first connection lane $\mathbf{611}_1$. The SSD 604 also includes a working memory $\mathbf{610}_1$ (such as random access memory (RAM)), an NVM interface $\mathbf{612}_1$ (which may be referred to as a flash interface or backend interface), and the NVM $\mathbf{614}_1$, such as one or more NVM NAND dies or NVM arrays. The data storage controller $\mathbf{608}_1$ includes a power controller $\mathbf{616}_1$ and a notification controller $\mathbf{618}_1$. The power controller $\mathbf{616}_1$ provides full power to the data storage controller $\mathbf{608}_1$ (and other components such as working memory $\mathbf{610}_1$) while the USB plug 607 and USB socket 609 are in the first mating configuration, but reduces power to those components while the USB plug 607 and USB socket 609 are in the second mating configuration. The notification controller $\mathbf{618}_1$ notifies the host 602 of the NVM $\mathbf{614}_1$ that is accessible at USB 10 Gbps while the USB plug 607 and USB socket 609 are in the first mating configuration. The notification controller $\mathbf{618}_1$ also notifies the host 602 that the second NVM $\mathbf{614}_2$ instead can be accessed at USB 10 Gbps if the user flips the USB plug 607 and USB socket 609 to the second mating configuration. The host 602 can then notify the user of that option via an appropriate display screen indication.

The SSD 604 also includes a front end (protocol) interface 606$_2$ for interfacing with host 602 via the USB-C-compatible protocol using a second connection lane 611$_2$. The SSD 604 also includes a working memory 610$_2$ (such as RAM), an NVM interface 612$_2$ (e.g., flash interface or backend interface), and the NVM 614$_2$, such as one or more NVM NAND dies or NVM arrays. The data storage controller 608$_2$ also includes a power controller 616$_2$ and a notification controller 6182. The power controller 616$_2$ provides full power to data storage controller 608$_2$ (and other components such as working memory 610$_2$) while the USB plug 607 and USB socket 609 are in the second mating configuration, but reduces power to those components while the USB plug 607 and USB socket 609 are in the first mating configuration. The notification controller 6182 notifies the host 602 of the NVM 614$_2$ that is accessible at USB 10 Gbps while the USB plug 607 and USB socket 609 are in the second mating configuration. The notification controller 6182 also notifies the host 602 that the first NVM 614$_1$ instead can be accessed at USB 10 Gbps if the user flips the USB plug 607 and USB socket 609 to the first mating configuration. The host 602 can then notify the user of that option via an appropriate display screen indication.

Note that although the power controllers and notification controllers are shown as components of the data storage controllers, they may be implemented as separate components. Moreover, rather than having separate power controllers and notification controllers, as shown, a single power controller and/or single notification controller can instead be provided, i.e., as components that are separate from the data storage controllers.

In the primary examples herein, the host 602 is a laptop computer. However, host 602 may be any system or device needing data storage or retrieval and a compatible interface for communicating with the SSD 604. For example, the host 602 may be a computing device, a desktop computer, a personal computer, a portable computer, a workstation, a server, a personal digital assistant, a digital camera, an Internet of Things (IoT) device, or a mobile phone. Still further, in some examples, the host may be any other device accessible via USB-C or a similar communication interface having a reversible connection scheme.

In the primary examples described herein, the cable 605 provides a USB-C interface. However, in other examples, other suitable communication interfaces may be used, if configured with reversible connectors that can be physically coupled in one of two mating configurations, e.g., the connectors have a physically symmetric but electrically asymmetric pinout to thereby permit the mating orientation to be detected from the electrical asymmetry. For example, the Thunderbolt 4 interface is reversible. Aspects described herein may also be applicable to the Peripheral Component Interconnect Express (PCIe) interface. Future versions of USB interfaces are also expected to be reversible.

Note that the data storage controllers 608$_1$ and 608$_2$ of FIG. 6 may include any type of processing device, such as a microprocessor, a microcontroller, an embedded controller, a logic circuit, software, firmware, or the like, for controlling the operation of the SSD 604. In some aspects, some or all of the functions described herein as performed by one or both of the data storage controllers may instead be performed by another element of the SSD 604. For example, the SSD 604 may include a microprocessor, a microcontroller, an embedded controller, a logic circuit, software, firmware, or any kind of processing device, for performing one or more of the functions described herein as being performed by one or both of the data storage controllers.

The working memories 610$_1$ and 610$_2$ of FIG. 6 may be any suitable memory or system capable of storing data. For example, the memories may be ordinary RAM, DRAM, double data rate (DDR) RAM (DRAM), static RAM (SRAM), synchronous dynamic RAM (SDRAM), flash storage, an erasable programmable read-only-memory (EPROM), an electrically erasable programmable ROM (EEPROM), or the like. In various embodiments, the data storage controllers use the working memories, or portions thereof, to store data during the transfer (transference) of data between the host 602 and the NVMs. For example, the working memories or portions thereof may be a cache memory. The NVMs 614$_1$ and 614$_2$ may be any suitable type of non-volatile memory, such as a NAND-type flash memory or the like.

Although FIG. 6 shows an exemplary SSD that is configured as an SSD with flash NAND NVM, the various disclosed embodiments are not necessarily limited to an SSD application/implementation. The disclosed NVM dies and associated processing components can be implemented as part of a package that includes other processing circuitry and/or components. For example, a processor may include, or otherwise be coupled with, embedded NVM and associated circuitry and/or components. The processor could, as one example, offload certain tasks to the NVM and associated circuitry and/or components. Still further, the data storage device 604 may have volatile memory such as DRAM chips instead of NAND dies as its primary memory. That is, NVM 614$_1$ may instead be a first DRAM and NVM 614$_2$ may instead be a second DRAM. In such an implementation, the interfaces 612$_1$ and 612$_2$ would not be flash interfaces but double/dual data rate (DDR) interfaces for use with the DRAMs.

Figure 7:
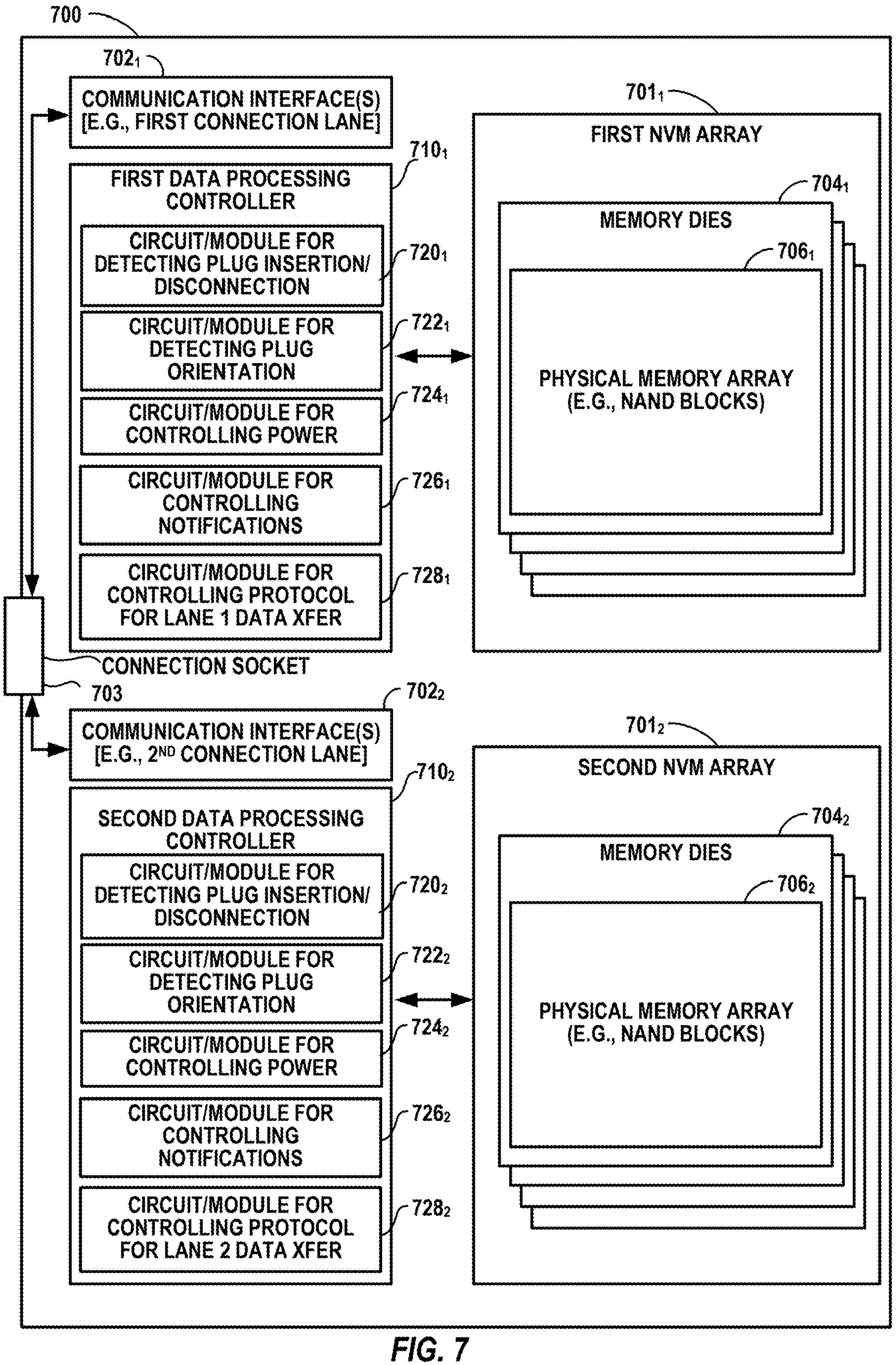
FIG. 7 is a schematic block diagram configuration for an exemplary apparatus, such as an SSD, configured according to aspects of the present disclosure.

FIG. 7 illustrates an embodiment of an apparatus 700 configured according to one or more aspects of the disclosure. The apparatus 700, or components thereof, could embody or be implemented as a data storage controller within a portable SSD, or other type of device that supports computations and data storage.

The apparatus 700 has a first set of components denoted by subscript 1 and a second set of components denoted by subscript 2, whose operations may vary depending upon a plug orientation within a connection socket 703, which may be a USB-C connection socket. (In FIG. 7, the plug is not shown, but see, e.g., FIG. 6.) A first data processing controller 710$_1$ is communicatively coupled to a first NVM die array 701$_1$ that includes one or more memory dies 704$_1$, each of which may include physical memory arrays 706$_1$, e.g., NAND blocks. The data processing controller 710$_1$ may include various modules/circuits, including firmware (FW) components. These components can be coupled to and/or placed in electrical communication with one another and with the NVM die array 701$_1$ via suitable components, represented generally by connection lines in FIG. 7. Although not shown, other circuits such as timing sources, peripherals, voltage regulators, and power management circuits may be provided, which are well known in the art, and therefore, will not be described any further.

In some examples, the memory dies may include on-chip circuitry such as under-the-array circuitry. The memory dies 704$_1$ may be communicatively coupled to the data processing controller 710$_1$ such that the apparatus 700 can read or sense information from, and write or program information to, the physical memory array 706$_1$. That is, the physical memory array $706_1$ can be coupled to controller $710_1$ so that the physical memory array $706_1$ is accessible by the controller $710_1$. The dies may additionally include, e.g., input/output components, registers, voltage regulators, etc. The connection between the controller $710_1$ and the memory dies $704_1$ of the NVM die array $701_1$ may include, for example, one or more busses.

The apparatus 700 includes a first communication interface $702_1$, e.g. a first communication lane (lane 1), for connecting via socket 703 to a laptop, a mobile phone, etc. using, e.g., USB-C-compatible protocols (such as USB 10 Gbps or USB 2.0) other suitable communication protocols. More generally, the communication interface $702_1$ provides a means for communicating with other apparatuses over a transmission medium. In some implementations, the communication interface $702_1$ includes circuitry and/or programming (e.g., a program) adapted to facilitate the communication of information bi-directionally with respect to one or more devices in a system. In some implementations, the communication interface $702_1$ may be configured for wire-based communication. For example, the communication interface $702_1$ could be a send/receive interface or some other type of signal interface including circuitry for outputting and/or obtaining signals (e.g., signals to/from a host). The communication interface $702_1$ serves as one example of a means for receiving and/or a means for transmitting.

The modules/circuits of the data storage controller $710_1$ are arranged or configured to obtain, process, and/or send data, control data access and storage, issue or respond to commands, and control other desired operations. For example, the controller $710_1$ may be implemented as one or more processors, one or more controllers, and/or other structures configured to perform functions. According to one or more aspects of the disclosure, the controller $710_1$ may be adapted to perform any or all of the features, processes, functions, operations, and/or routines described herein as being performed by the data storage controller. For example, the controller $710_1$ may be configured to perform any of the data storage controller steps, functions, and/or processes described with respect to FIGS. 3-6 and FIGS. 8-9, discussed below.

As used herein, the term "adapted" in relation to the data processing controller $710_1$ may refer to the modules/circuits being one or more of configured, employed, implemented, and/or programmed to perform a particular process, function, operation and/or routine according to various features described herein. The modules/circuits may include a specialized processor, such as an application-specific integrated circuit (ASIC) that serves as a means for (e.g., structure for) carrying out any one of the data storage controller operations described in conjunction with, e.g., FIGS. 3-6 and 8-9. The modules/circuits serve as an example of a means for processing. In various implementations, the modules/circuits may provide and/or incorporate, at least in part, functionality described above for the components in various embodiments shown, including for example data storage controller $608_1$ of FIG. 6.

According to at least one example of the apparatus 700, the data processing controller $710_1$ may include one or more of: a circuit/module $720_1$ for detecting plug insertion/disconnection via communication interface $702_1$ (see, again, the USB-C plugs/sockets discussed above and the electrical asymmetry of the CC1 and CC2 pins); a circuit/module $722_1$ for detecting plug orientation (by detecting, e.g., a CC1 connection instead of a CC2 connection) and, in response to a CC1 connection, for enabling access by a host via an external cable to the first NVM array $701_1$ via the first connection lane at USB 10 Gbps, or, in response to a CC2 connection, for enabling access by the host via the external cable to the first NVM array $701_1$ via the first connection lane at USB 2.0 at 480 Mbps; a circuit/module $724_1$ for controlling power (e.g., to provide full power to the subscript 1 components if CC1 is active but reduced power to the subscript 1 components if CC2 is instead active); a circuit/module $726_1$ for controlling notifications sent to the host (as described above); and a circuit/module $728_1$ for controlling the protocol for data transfer between the host and the first NVM array $701_1$ based on the mating orientation (e.g., for providing USB 10 Gbps along lane 1 in the first mating configuration and USB 2.0 along lane 1 in the second mating configuration).

In at least some examples, means may be provided for performing the functions illustrated in FIG. 7 and/or other functions illustrated or described herein. For example, the means may include one or more of: means, such as circuit/module $720_1$, for detecting plug insertion/disconnection via communication interface $702_1$; means, such a circuit/module $722_1$, for detecting plug orientation; means, such a circuit/module $724_1$, for controlling power; means, such a circuit/module $726_1$, for controlling notifications sent to the host; and means, such a circuit/module $728_1$, for controlling the protocol for data transfer between the host and the first NVM array $701_1$ based on the mating orientation (e.g., for providing USB 10 Gbps along lane 1 in the first mating configuration and USB 2.0 along lane 1 in the second mating configuration). In yet another aspect of the disclosure, a non-transitory computer-readable medium is provided that has one or more instructions which when executed by a processing circuit in an SSD causes the data storage controller of the SSD to perform one or more of the functions or operations listed above.

As noted, a second set of components are provided, which may be configured the same as the first set of components but which operate in accordance with USB 2.0 if the first set of components are operating in accordance with USB 10 Gbps, and operate in accordance with USB 10 Gbps if the first set of components are operating in accordance with USB 2.0. The second set of components will only briefly be described. A data processing controller $710_2$ is communicatively coupled to a second NVM die array $701_2$ that includes one or more memory dies $704_2$, each of which may include physical memory arrays $706_2$, e.g., NAND blocks. The apparatus 700 includes a second communication interface $702_2$, e.g. a second communication lane, connected to the socket 703.

According to at least one example of the apparatus 700, the data processing controller $710_2$ may include one or more of: a circuit/module $720_2$ for detecting plug insertion/disconnection via communication interface $702_2$; a circuit/module $722_2$ for detecting plug orientation (by detecting, e.g., a CC1 connection instead of a CC2 connection) and, in response to a CC2 connection, for enabling access by a host via an external cable to the second NVM array $701_2$ via the second connection lane at USB 10 Gbps, or, in response to a CC1 connection, for enabling access by the host via the external cable to the second NVM array $701_2$ via the second connection lane at USB 2.0 at 480 Mbps; a circuit/module $724_2$ for controlling power (e.g., to provide full power to the subscript 2 components if CC2 is active but reduced power to the subscript 2 components if CC1 is instead active); a circuit/module $726_2$ for controlling notifications sent to the host (as described above); and a circuit/module $728_2$ for controlling the protocol for data transfer between the host and the second NVM array $701_2$ based on the mating orientation (e.g., for providing USB 10 Gbps along lane 2 in the second mating configuration and USB 2.0 along lane 2 in the first mating configuration).

According to at least one example of the apparatus 700, the processing controller $\mathbf{710}_2$ may include one or more of: means, such as circuit/module $\mathbf{720}_2$, for detecting plug insertion/disconnection via communication interface $\mathbf{702}_2$; means, such a circuit/module $\mathbf{722}_2$, for detecting plug orientation; means, such a circuit/module $\mathbf{724}_2$, for controlling power; means, such a circuit/module $\mathbf{726}_2$, for controlling notifications sent to the host; and means, such a circuit/module $\mathbf{728}_2$, for controlling the protocol for data transfer between the host and the first NVM array $\mathbf{701}_2$ based on the mating orientation (e.g., for providing USB 10 Gbps along lane 2 in the second mating configuration and USB 2.0 along lane 2 in the first mating configuration). In yet another aspect of the disclosure, a non-transitory computer-readable medium is provided that has one or more instructions which when executed by a processing circuit in an SSD causes the data storage controller of the SSD to perform one or more of the functions or operations listed above.

Still further, note that: circuit/modules $\mathbf{722}_1$ and $\mathbf{722}_1$ provide a means for detecting a connection of a second connector (e.g., a USB-C plug connector) with a first connector (e.g., a USB-C socket connector) in a first mating orientation. Circuit/module $\mathbf{728}_1$ provides a means, operative in response to detecting the connection of the second connector with the first connector in the first mating orientation, for enabling access by the host via an external cable to the first NVM array $\mathbf{704}_1$ under the control of the first data storage controller $\mathbf{710}_1$ with a first communication protocol. Circuit/module $\mathbf{728}_2$ provides means, also operative in response to detecting the connection of the second connector with the first connector in the first mating orientation, for enabling access by the host via the external cable to the second NVM array $\mathbf{704}_2$ under the control of the second data storage controller $\mathbf{710}_2$ with a second, different communication protocol. Circuit/modules $\mathbf{720}_1$ and $\mathbf{720}_2$ provide means for detecting a disconnection of the second connector from the first connector and, in response, for disabling access by the host to the first and second NVM arrays, respectively. Circuit/modules $\mathbf{722}_1$ and $\mathbf{722}_1$ provide means for detecting a connection of the second connector with the first connector in the second, different mating orientation with the first connector. Circuit/module $\mathbf{728}_1$ provides a means, operative in response to detecting the connection of the second connector with the first connector in the second mating orientation, for enabling access by the host via the external cable to the first NVM array $\mathbf{704}_1$ under the control of the first data storage controller $\mathbf{728}_1$ with the second communication protocol. Circuit/module $\mathbf{728}_2$ provides a means, operative in response to detecting the connection of the second connector with the first connector in the second mating orientation, for enabling concurrent access by the host via the external cable to the second NVM array $\mathbf{704}_2$ under the control of the second data storage controller $\mathbf{728}_2$ with the first communication protocol. In the first mating orientation, the first communication protocol may be USB 10 Gbps or higher and the second communication protocol may be USB 2.0. In the second mating orientation, the first communication protocol may be USB 2.0 and the second communication protocol may be USB 10 Gbps or higher.

Additional Exemplary Embodiments

Figure 8:
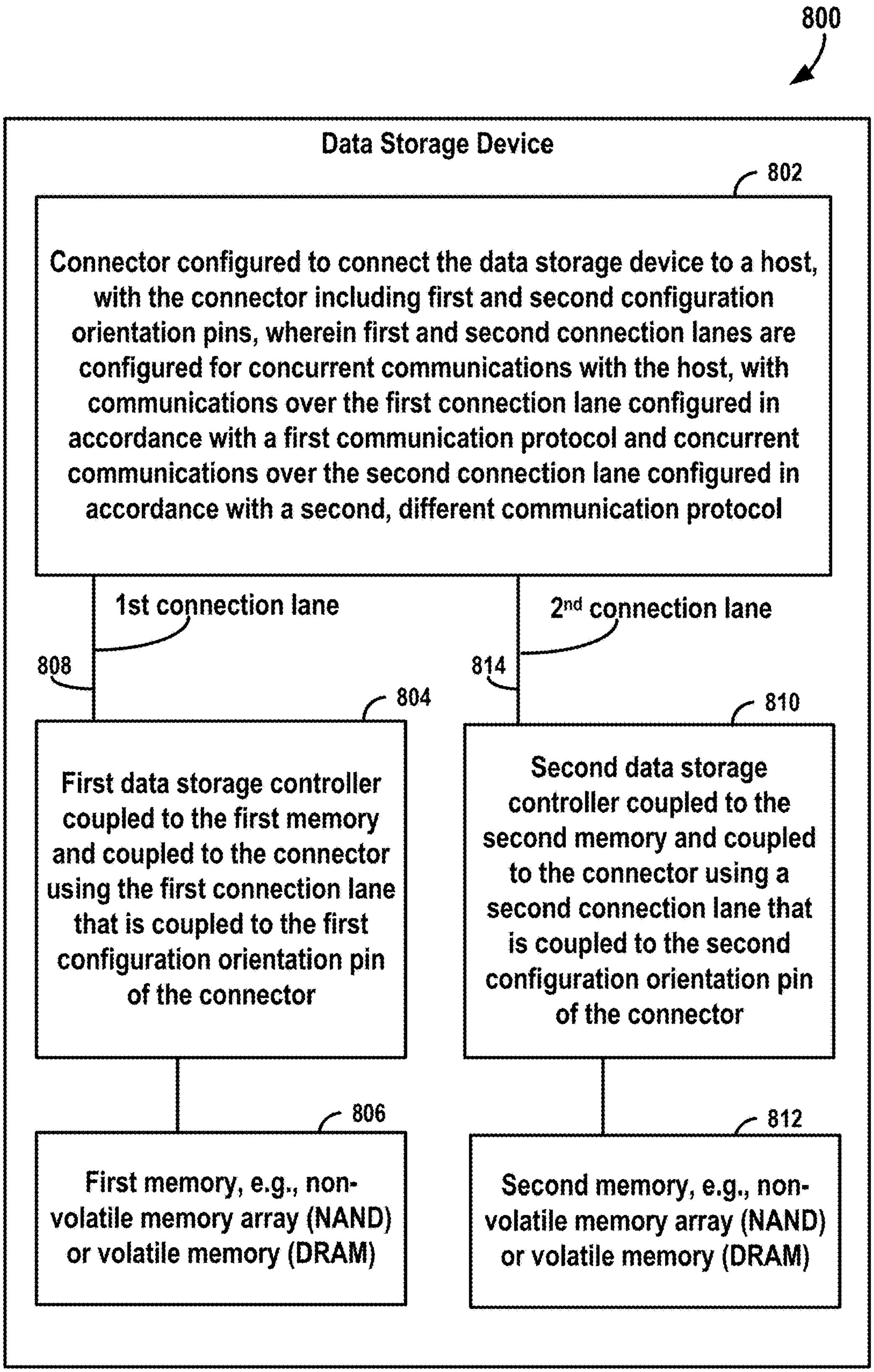
FIG. 8 is a schematic block diagram configuration for an exemplary data storage device configured according to aspects of the present disclosure.

FIG. 8 is a block diagram of an exemplary data storage device 800 in accordance with some aspects of the disclosure. The data storage device 800 includes: a (first) connector 802 (such as a USB-C socket) configured to connect the data storage device to a host via an external (second) connector (such as a USB-C cable with a USB-C plug), with the connector 802 including first and second configuration orientation pins (e.g., CC1 and CC2). First and second connection lanes 808 and 814, respectively, are configured for concurrent communications with the host, with communications over the first connection lane configured in accordance with a first communication protocol and concurrent communications over the second connection lane configured in accordance with a second, different communication protocol. The data storage device 800 also includes: a first data storage controller 804 coupled to a first memory 806 (which may be an NVM such as a NAND or a volatile memory such as a DRAM) and coupled to the connector 802 using the first connection lane 808 that is coupled to the first configuration orientation pin (e.g., CC1) of the connector 802. The data storage device 800 also includes: a second data storage controller 810 coupled to a second memory 812 (which also may be an NVM such as a NAND or a volatile memory such as a DRAM) and coupled to the connector 802 using the second connection lane 814 that is coupled to the second configuration orientation pin (e.g., CC2) of the connector 802. Both of the connection lanes (808, 814) are communicatively coupled to the data storage device to the host via the connector 802 for concurrent communication, with communications over the first connection lane configured in accordance with a first communication protocol and concurrent communications over the second connection lane configured in accordance with a second, different communication protocol. In the first mating orientation, the first communication protocol may be USB 10 Gbps or higher and the second communication protocol may be USB 2.0. In the second mating orientation, the first communication protocol may be USB 2.0 and the second communication protocol may be USB 10 Gbps or higher. In other examples, the USB2.0 (480 Mbps) protocol instead could be USB1.1 (12 Mbps). Similarly, the 10 Gbps protocol could instead be 5 Gbps as well.

Figure 9:
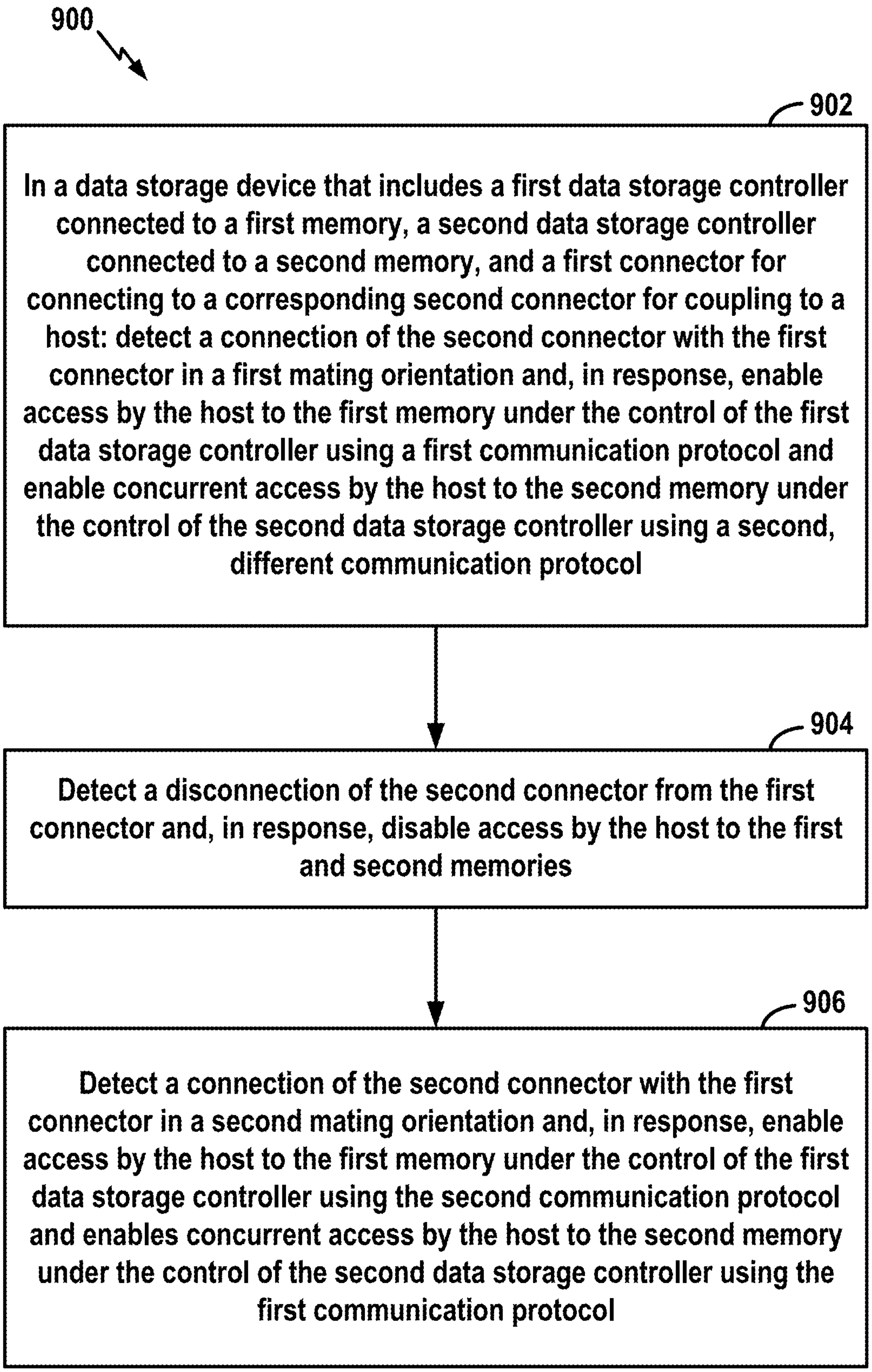
FIG. 9 illustrates an exemplary procedure according to aspects of the present disclosure.

FIG. 9 illustrates a method or process 900 in accordance with some aspects of the disclosure for use by data storage device that includes a first data storage controller connected to a first memory, a second data storage controller connected to a second memory, and a first connector for connecting to a corresponding second connector coupled to a host. At block 902, the data storage device detects a connection of the second connector with the first connector in a first mating orientation and, in response, enables access by the host (e.g. via an external cable having the second connector) to the first memory under the control of the first data storage controller using a first communication protocol and enables concurrent access by the host (e.g., via the external cable) to the second memory under the control of the second data storage controller using a second, different communication protocol. At block 904, the data storage device detects disconnection of the second connector from the first connector and, in response, disables access by the host to the first and second memories. At block 906, the data storage device detects a connection of the second connector with the first connector in a second mating orientation and, in response, enables access by the host to the first memory under the control of the first data storage controller using the second communication protocol and enables concurrent access by the host to the second memory under the control of the second data storage controller using the first communication protocol. In the first mating orientation, the first communication protocol may be USB 10 Gbps or higher and the second communication protocol may be USB 2.0. In the second mating orientation, the first communication protocol may be USB 2.0 and the second communication protocol may be USB 10 Gbps or higher. In other examples, the USB2.0 (480 Mbps) protocol instead could be USB1.1 (12 Mbps). Similarly, the 10 Gbps protocol could instead be 5 Gbps as well.

Additional Aspects

Aspects of the subject matter described herein can be implemented in any suitable NAND flash memory, such as 3D NAND flash memory. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. Sec, also, 3D XPoint (3DXP)) memories. Each type of memory device may have different configurations. For example, flash memory devices may be configured in a NAND or a NOR configuration.

In addition to data storage devices, the NVM arrays (and associated circuitry and latches, where appropriate) in various described embodiments may be implemented as part of memory devices such as dual in-line memory modules (DIMMs) or other types of memory components/modules in some embodiments. Such memory devices may be accessible to a processing component such as a Central Processing Unit (CPU) or a Graphical Processing Unit (GPU). The links between processing components to such memory devices may be provided via one or more memory or system buses, including via interconnects such as Compute Express Link (CXL), Gen-Z, OpenCAPI, NVLink/NVSwitch, Infinity Fabric, Omni-Path, and other similar interconnect protocols. In other embodiments, the links between processing components to memory devices may be provided via on-die or die-to-die interconnects. In certain embodiments, the NVM arrays and associated circuitry may be co-located on the same die as the processing components such as CPU or GPU. In other examples, data may be stored in as hard disk drives (HDDs) or hybrid drives, etc.

Regarding the application of the features described herein to other memories besides NAND: NOR, 3DXP, PCM, and RERAM have page-based architectures and programming processes that usually require operations such as shifts, XORs, ANDs, etc. If such devices do not already have latches (or their equivalents), latches can be added to support the latch-based operations described herein. Note also that latches can have a small footprint relative to the size of a memory array as one latch can connect to many thousands of cells, and hence adding latches does not typically require much circuit space.

The memory devices can be formed from passive and/or active elements, in any combination. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bitline and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-y direction plane) which extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bitlines and word lines.

A three-dimensional memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the z direction) with each column having multiple memory elements in each column. The columns may be arranged in a two-dimensional configuration, e.g., in an x-y plane, resulting in a three-dimensional arrangement of memory elements with elements on multiple vertically stacked memory planes. Other configurations of memory elements in three dimensions can also constitute a three-dimensional memory array.

By way of a non-limiting example, in a three-dimensional NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements that span through multiple memory levels. Three-dimensional memory arrays may also be designed in a NOR configuration and a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but covers all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer-readable medium having stored thereon computer-executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application-specific integrated circuits. In addition, a computer-readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "cither" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, datastore, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage device, comprising:

a first data storage controller coupled to a first memory and coupled to a connector of the data storage device using a first connection lane that is coupled to the connector, wherein the connector is configured to connect the data storage device to a host;

a second data storage controller coupled to a second memory and coupled to the connector of the data storage device using a second connection lane that is coupled to the connector; and wherein the first and second connection lanes are configured for concurrent communications with the host, with communications over the first connection lane configured in accordance with a first communication protocol and concurrent communications over the second connection lane configured in accordance with a second, different communication protocol, wherein the connector of the data storage device is a first connector configured to connect with a corresponding second connector coupled to the host, with the first and second connectors having physically symmetric pinouts and configured to mate with one another in either a first mating orientation or a second mating orientation, wherein, in the first mating orientation, the first communication protocol provides a first data communication rate and the second communication protocol provides a second data communication rate that is slower than the first data communication rate, and wherein, in the second mating orientation, the first communication protocol provides the second, slower data communication rate and the second communication protocol provides the first data communication rate.

2. The data storage device of claim 1, wherein, in the first mating orientation, the first communication protocol specifies at least 10 giga-bits-per-second (Gbps) and the second communication protocol specifies no more than 480 mega-bits-per-second (Mbps); and wherein, in the second mating orientation, the first communication protocol specifies no more than 480 Mbps and the second communication protocol specifies at least 10 Gbps.

3. The data storage device of claim 1, wherein, in the first mating orientation, the first communication protocol is universal serial bus (USB) 10 Gbps or higher and the second communication protocol is USB 2.0; and wherein, in the second mating orientation, the first communication protocol is USB 2.0 and the second communication protocol is USB 10 Gbps or higher.

4. The data storage device of claim 3, wherein, in the first mating orientation, the second data storage controller is configured to perform background transfers of data from the host using USB 2.0; and wherein, in the second mating orientation, the second data storage controller is configured to perform background transfers of data from the host using USB 10 Gbps.

5. The data storage device of claim 3, wherein, in the first mating orientation, the second data storage controller is configured to perform an automatic backup of data from the host using USB 2.0; and wherein, in the second mating orientation, the second data storage controller is configured to perform the automatic backup of data from the host using USB 10 Gbps.

6. The data storage device of claim 1, wherein the first connector and the second connector are compatible with universal serial bus (USB) Type C specifications.

7. The data storage device of claim 6, wherein the first connector is a socket and the second connector is a plug.

8. The data storage device of claim 1, wherein the connector is a universal serial bus (USB) Type C connector, the connector comprising a first configuration channel (CC) pin (CC1) coupled to the first connection lane, and a second CC pin (CC2) coupled to the second connection lane.

9. The data storage device of claim 1, wherein the first memory comprises a first plurality of NAND chips or dynamic random access memory (DRAM) chips, and wherein the second memory comprises a second plurality of NAND chips or DRAM chips.

10. A method for use by a data storage device that includes a first data storage controller connected to a first memory, a second data storage controller connected to a second memory, and a first connector for connecting to a corresponding second connector for coupling to a host, the method comprising:

detecting a connection of the second connector with the first connector in a first mating orientation and, in response, enabling access by the host to the first memory under the control of the first data storage controller using a first communication protocol and enabling concurrent access by the host to the second memory under the control of the second data storage controller using a second, different communication protocol;

detecting disconnection of the second connector from the first connector and, in response, disabling access by the host to the first and second memories; and detecting a connection of the second connector with the first connector in a second mating orientation and, in response, enabling access by the host to the first memory under the control of the first data storage controller using the second communication protocol and enabling concurrent access by the host to the second memory under the control of the second data storage controller using the first communication protocol.

11. The method of claim 10, wherein the first connector has a physically symmetric pinout comprising a first configuration orientation pin and a second configuration orientation pin;

wherein detecting the connection of the second connector in the first mating orientation comprises detecting an electrical connection from the first data storage controller to the host via the first configuration orientation pin; and wherein detecting the connection of the second connector in the second mating orientation comprises detecting an electrical connection from the second data storage controller to the host via of the second configuration orientation pin.

12. The method of claim 11, wherein the connector is a universal serial bus (USB) Type-C connector, the first configuration orientation pin is a first configuration channel pin (CC1), and the second configuration orientation pin is a second configuration channel pin (CC2);

wherein detecting the connection of the second connector in the first mating orientation further comprises detecting an electrical connection from the first data storage controller to the host via CC1; and wherein detecting the connection of the second connector in the second mating orientation comprises detecting an electrical connection of the second data storage controller to the host via CC2.

13. The method of claim 11, wherein, in the first mating orientation, the first communication protocol specifies first data communication rate and the second communication protocol specifies a second data communication rate that is slower than the first data communication rate; and wherein, in the second mating orientation, the first communication protocol specifies the second, slower data communication rate and the second communication protocol specifies for the first data communication rate.

14. The method of claim 11, wherein, in the first mating orientation, the first communication protocol specifies at least 10 giga-bits-per-second (Gbps) and the second communication protocol specifies no more than 480 mega-bits-per-second (Mbps); and wherein, in the second mating orientation, the first communication protocol specifies no more than 480 Mbps and the second communication protocol specifies at least 10 Gbps.

15. The method of claim 11, wherein, in the first mating orientation, the first communication protocol is universal serial bus (USB) 10 Gbps or higher and the second communication protocol is USB 2.0; and wherein, in the second mating orientation, the first communication protocol is USB 2.0 and the second communication protocol is USB 10 Gbps or higher.

16. The method of claim 15, wherein, in the first mating orientation, the second data storage controller performs background transfers of data from the host using USB 2.0; and wherein, in the second mating orientation, the first data storage controller performs background transfers of data from the host using USB 10 Gbps.

17. The method of claim 15, wherein, in the first mating orientation, the second data storage controller performs an automatic backup of data from the host using USB 2.0; and wherein, in the second mating orientation, the first data storage controller performs the automatic backup of data from the host using USB 10 Gbps.

18. An apparatus for use with a data storage device that includes a first data storage controller connected to a first memory, a second data storage controller connected to a second memory, and a first connector for connecting to a corresponding second connector for coupling to a host, the apparatus comprising:

means for detecting a connection of the second connector with the first connector in a first mating orientation;

means, operative in response to detecting the connection of the second connector with the first connector in the first mating orientation, for enabling access by a host to the first memory under the control of the first data storage controller with a first communication protocol;

means, operative in response to detecting the connection of the second connector with the first connector in the first mating orientation, for enabling concurrent access by the host to the second memory under the control of the second data storage controller with a second, different communication protocol;

means for detecting a disconnection of the second connector from the first connector and, in response, for disabling access by the host to the first and second memories; and means for detecting a connection of the second connector with the first connector in a second mating orientation;

means, operative in response to detecting the connection of the second connector with the first connector in the second mating orientation, for enabling access by the host to the first memory under the control of the first data storage controller using the second communication protocol; and means, operative in response to detecting the connection of the second connector with the first connector in the second mating orientation, for enabling concurrent access by the host to the second memory under the control of the second data storage controller using the first communication protocol.

19. A data storage device, comprising:

a first data storage controller coupled to a first memory and coupled to a connector of the data storage device using a first connection lane that is coupled to a first configuration orientation pin of the connector, wherein the connector is configured to connect the data storage device to a host;

a second data storage controller coupled to a second memory and coupled to the connector of the data storage device using a second connection lane that is coupled to a second configuration orientation pin of the connector; and wherein the first and second connection lanes are configured for concurrent communications with the host, with communications over the first connection lane configured in accordance with a first communication protocol and concurrent communications over the second connection lane configured in accordance with a second, different communication protocol, wherein the first connection lane provides a first data communication rate and the second connection lane provides a second data communication rate different from the first data communication rate, in response to an orientation signal at the first orientation pin, and wherein the first connection lane provides the second data communication rate and the second connection lane provides the first data communication rate, in response to the orientation signal at the second orientation pin.

* * * * *